(12) United States Patent
Shtok et al.

(10) Patent No.: US 11,620,796 B2
(45) Date of Patent: Apr. 4, 2023

(54) EXPERT KNOWLEDGE TRANSFER USING EGOCENTRIC VIDEO

(71) Applicant: INTERNATIONAL BUSINESS MACHINES CORPORATION, Armonk, NY (US)

(72) Inventors: Joseph Shtok, Binyamina (IL); Leonid Karlinsky, Mazkeret Batya (IL); Adi Raz Goldfarb, Akko (IL); Oded Dubovsky, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 17/249,371

(22) Filed: Mar. 1, 2021

(65) Prior Publication Data
US 2022/0277524 A1 Sep. 1, 2022

(51) Int. Cl.
G06T 19/00 (2011.01)
G09B 19/00 (2006.01)
G06T 7/194 (2017.01)
G06T 17/00 (2006.01)
G09B 5/02 (2006.01)
G09B 5/06 (2006.01)

(52) U.S. Cl.
CPC ............ G06T 19/006 (2013.01); G06T 7/194 (2017.01); G06T 17/00 (2013.01); G09B 5/02 (2013.01); G09B 19/003 (2013.01); *G06T 2207/10016* (2013.01); *G06T 2207/30196* (2013.01); *G09B 5/065* (2013.01)

(58) Field of Classification Search
None
See application file for complete search history.

(56) References Cited

U.S. PATENT DOCUMENTS

| 2013/0278631 | A1* | 10/2013 | Border | G06Q 30/02 |
| | | | | 345/633 |
| 2018/0315329 | A1* | 11/2018 | D'Amato | G09B 5/02 |
| 2018/0324229 | A1 | 11/2018 | Ross | |
| 2019/0243599 | A1* | 8/2019 | Rochford | G06F 3/147 |

(Continued)

OTHER PUBLICATIONS

Bhatacharya, "Automatic Generation of Augmented Reality Guided Assembly Instructions Using Expert Demonstration", Iowa State University Digital Repository, 2016, Part 1, 96 pages.

(Continued)

*Primary Examiner* — David H Chu
(74) *Attorney, Agent, or Firm* — Brandon L. Stephens

(57) ABSTRACT

A method, a computer program product, and a computer system for transferring knowledge from an expert to a user using a mixed reality rendering. The method includes determining a user perspective of a user viewing an object on which a procedure is to be performed. The method includes determining an anchoring of the user perspective to an expert perspective, the expert perspective associated with an expert providing a demonstration of the procedure. The method includes generating a virtual rendering of the expert at the user perspective based on the anchoring at a scene viewed by the user, the virtual rendering corresponding to the demonstration of the procedure as performed by the expert. The method includes generating a mixed reality environment in which the virtual rendering of the expert is shown in the scene viewed by the user.

16 Claims, 6 Drawing Sheets

(56) References Cited

U.S. PATENT DOCUMENTS

| | | | | |
|---|---|---|---|---|
| 2019/0304406 | A1* | 10/2019 | Griswold | G09G 5/14 |
| 2019/0377192 | A1* | 12/2019 | Ng-Thow-Hing | G09G 3/003 |
| 2020/0043354 | A1 | 2/2020 | Ha | |
| 2021/0097875 | A1* | 4/2021 | Alexander, IV | G06T 13/40 |

OTHER PUBLICATIONS

Bhatacharya, "Automatic Generation of Augmented Reality Guided Assembly Instructions Using Expert Demonstration", Iowa State University Digital Repository, 2016, Part 2, 98 pages.

Gonzalez, "Augmented Reality: Enhancing Your Field of Vision", https://www.asme.org/topics-resources/content/augmented-reality-enhancing-your-field-of-vision, 9/23/201, pp. 1-10.

Hasan, "Hand Gesture Modeling and Recognition using Geometric Features: A Review", ResearchGate, https://www.researchgate.net/publication/221932086, Mar. 2012, pp. 1-16.

Haug et al., "Movement analysis in laparoscopic surgery training", https://dl.acm.org/doi/10.5555/2685617.2685658, SummerSim '14: Proceedings of the 2014 Summer Simulation Multiconference, Jul. 2014, Article No. 41, pp. 1-3.

https://www.theconstructionindex.co.uk/news/view/thyssenkrupp-brings-in-holograms-to-help-with-lift-maintenance, "Holograms to help with lift maintenance", Sep. 23, 2020, pp. 1-8.

Limbu et al., "Using sensors and augmented reality to train apprentices using recorded expert performance: A systematic literature review", Educational Research Review 25 (2018), 1-22.

Mell et al., "The NIST Definition of Cloud Computing", National Institute of Standards and Technology, Special Publication 800-145, Sep. 2011, pp. 1-7.

Schlueter, "Remote maintenance assistance using real-time augmented reality authoring", Iowa State University, https://lib.dr.iastate.edu/cgi/viewcontent.cgi?article=7464&context=etd, 2018, pp. 1-72.

Shilkrot et al., "WorkingHands: A Hand-Tool Assembly Dataset for Image Segmentation and Activity Mining", https://www3.cs.stonybrook.edu/~minhhoai/papers/workingHands_BMVC19.pdf, 2019, pp. 1-12.

Sun et al., "Smart Sensor-Based Motion Detection System for Hand Movement Training in Open Surgery", J Med Syst (2017) 41: 24, pp. 1-14.

Tecchia et al., "3D Helping Hands: a Gesture Based MR System for Remote Collaboration", VRCA, 2012, Singapore, Dec. 2-4, 2012, pp. 1-6.

Visee, "An Effective and Efficient Method for Detecting Hands in Egocentric Videos for Rehabilitation Applications", https://arxiv.org/ftp/arxiv/papers/1908/1908.10406.pdf, IEEE transactions on Neural Systems and Rehabilitation Engineering, vol. 28, No. 3, Mar. 2020, pp. 748-755.

Whitlock et al., "AuthAR: Concurrent Authoring of Tutorials for AR Assembly Guidance", SIGCHI conference Proceedings Format, Graphics Interface Conference May 28-29, 2020, pp. 1-13.

* cited by examiner

EXPERT KNOWLEDGE TRANSFER USING EGOCENTRIC VIDEO

BACKGROUND

The exemplary embodiments relate generally to knowledge transfer, and more particularly to generating a model emulating an expert performing a procedure that is shown in a mixed reality rendering to a user.

In many different fields, professionals may perform procedures linked to various objects. For example, medical professionals may perform surgical procedures on patients. In another example, technicians may perform technical procedures on electronic and/or mechanical objects. The professional may require education on procedures for those that are unknown to the professional and/or for procedures that are complex such as on sophisticated equipment. For a repeatable procedure (e.g., utilizing a set of steps that are performed in sequence for each iteration of the procedure), an expert on the procedure may provide the proper instruction to a user. The instruction may be provided in a variety of manners. For example, a video of the expert performing the procedure may be recorded and the user may watch the video at a later time. In another example, a static or interactive video that provides the instructions may be presented to a user. However, such approaches may not properly convey all of the necessary information that may be required by a specific user as well as other drawbacks including long and tedious content presentation and inability to convey certain actions.

SUMMARY

The exemplary embodiments disclose a method, a computer program product, and a computer system for transferring knowledge from an expert to a user using a mixed reality rendering. The method comprises determining a user perspective of a user viewing an object on which a procedure is to be performed. The method comprises determining an anchoring of the user perspective to an expert perspective, the expert perspective associated with an expert providing a demonstration of the procedure. The method comprises generating a virtual rendering of the expert at the user perspective based on the anchoring at a scene viewed by the user, the virtual rendering corresponding to the demonstration of the procedure as performed by the expert. The method comprises generating a mixed reality environment in which the virtual rendering of the expert is shown in the scene viewed by the user.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
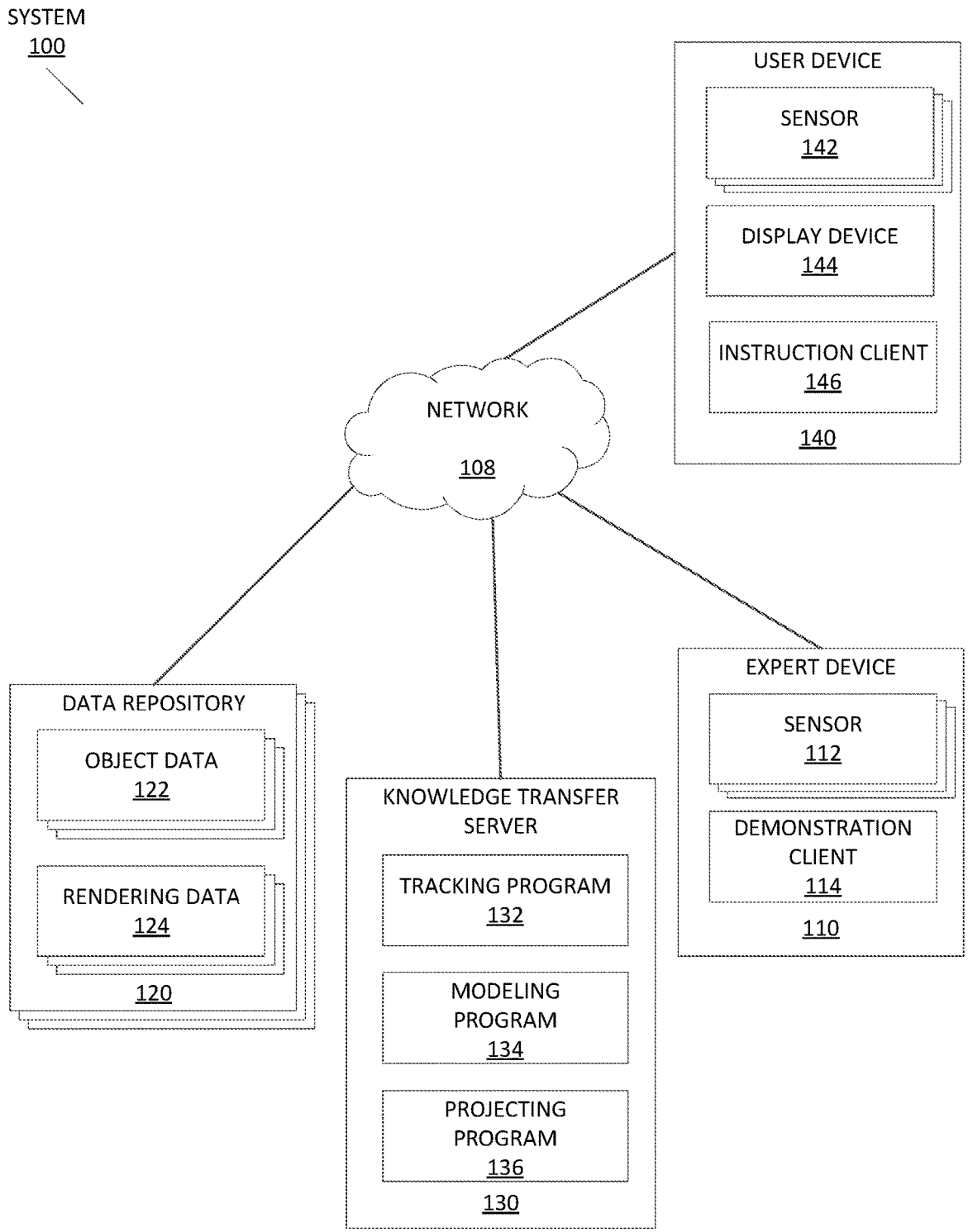
FIG. 1 depicts an exemplary schematic diagram of a knowledge transfer system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for transferring knowledge from an expert to a user using a mixed reality rendering. The exemplary embodiments provide a mechanism in which a user is provided the mixed reality rendering while performing a procedure. During the procedure, the exemplary embodiments generate a three-dimensional view of an expert performing the procedure in an augmented reality manner. The exemplary embodiments may provide the augmented reality experience as an overlay for the user being provided the mixed reality rendering to simulate the steps as performed by the expert so that the user may copy the expert in each step of the procedure without ambiguity. Key benefits of the exemplary embodiments may include providing a pertinent and engaging demonstration as performed by an expert to a user where each step and action is conveyed properly for the procedure to be performed by the user successfully. Detailed implementation of the exemplary embodiments follows.

Conventional approaches have provided a variety of mechanisms to transfer knowledge of a procedure from one individual to another. In a more classical sense, conventional approaches included classroom settings, mentoring, etc. Technological advances have allowed for more sophisticated methods of transferring knowledge between individuals. For example, a conventional approach may provide three-dimensional views of steps in the procedure so that the user may view the steps at different angles. In a particular manner of providing this conventional approach, three-dimensional capturing and rendering through real three-dimensional data may increase a feeling of immersion offered by the system using head-tracking, stereoscopic rendering, inter-occlusion handling, and virtual shadowing. In another example, a conventional approach may utilize augmented reality for guided assembly instructions of a device where the components of the device are shown being assembled and other captured imagery are removed. In further examples, conventional approaches utilize augmented reality and sensor technology for training purposes. Despite the advantages of these conventional approaches over prior methods, these conventional approaches may present long and tedious content preparation as well as fail to convey particular actions that are to be performed (e.g., the action is omitted altogether, the action may only be orally conveyed without an accompanying visual that leads to the action being failed, etc.).

The exemplary embodiments are configured to provide an improved manner of transferring knowledge of performing a procedure from an expert to a user. In providing this improved manner, the exemplary embodiments enable a display of the expert's hands and/or tools while performing a procedure, include verbal explanations where appropriate, and anchor the view of the display to the user's scene. The exemplary embodiments allow for an improved experience by a user, particularly since the user is able to mimic an expert's actions in positioning and movements by observing the expert in correspondence with the user (e.g., expert hands corresponding to user hands).

The exemplary embodiments are described with particular reference to performing complex procedures where an expert is an individual who has particular proficiency in the procedure. However, the exemplary embodiments may be utilized and/or modified for any procedure where a user may wish to view another performing the procedure concurrently, reinforce an already learned procedure, etc. The expert may also represent any entity with the proficiency in performing the procedure (e.g., an individual, a robot, etc.).

FIG. 1 depicts a knowledge transfer system 100, in accordance with the exemplary embodiments. According to the exemplary embodiments, the knowledge transfer system 100 may include an expert device 110, one or more data repositories 120, a knowledge transfer server 130, and a user device 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the knowledge transfer system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the knowledge transfer system 100 that do not utilize the network 108.

In the exemplary embodiments, the expert device 110 may include one or more sensors 112 and a demonstration client 114, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the expert device 110 is shown as a single device, in other embodiments, the expert device 110 may be comprised of a cluster or plurality of computing devices, in a modular manner, etc., working together or working independently. The expert device 110 is described in greater detail as a hardware implementation with reference to FIG. 4 (e.g., data processing according to the exemplary embodiments being performed by processor 02), as part of a cloud implementation with reference to FIG. 5 (e.g., the device 110 according to the exemplary embodiments being represented by the laptop computer 54C), and/or as utilizing functional abstraction layers for processing with reference to FIG. 6 (e.g., workload layer 90 including knowledge transfer processing 96 according to the exemplary embodiments). The expert device 110 may be utilized by an expert who is proficient in performing a procedure to a degree to instruct another in performing the procedure.

In the exemplary embodiments, the one or more sensors 112 may generate various types of information associated with actions being performed by the expert performing the procedure. The sensors 112 may be configured to generate motion capture data of the expert while the expert is performing the procedure. For example, the sensors 112 may include an imager such as a camera. In a particular exemplary embodiment, the camera may be a head mounted camera to provide an egocentric view from the perspective of the expert. There may be additional cameras that are positioned to capture further angles of the expert performing the procedure (e.g., cameras mounted in a third person perspective, in a zoomed in and/or out manner, etc.). The cameras may also utilize specialized features to generate the motion capture data. For example, the expert may wear specialized gloves with sensors and a specialized camera that registers various movements being performed via readings of the sensors. The above description of the sensors 112 including an imager is directed toward motion capture data associated with the hands of the expert. However, the procedure may involve other body parts (e.g., arms, legs, etc.). The sensors 112 may be appropriate positioned to generate the corresponding motion capture data for each body part involved in performing the procedure.

In another example, the sensors 112 may include components configured to generate motion data such as orientation, position, movement, etc. For example, the sensors 112 may include an accelerometer, a gyroscope, etc. The expert may wear this type of sensor 112 to capture the appropriate motion data associated with the body part that is wearing this sensor 112. The motion data generated by these types of sensors 112 may provide additional information that may be combined with the motion capture data of the expert (e.g., as generated by the imagers). In a further example, the sensors 112 may include a microphone configured to receive any auditory output from the expert. For example, the microphone may capture verbal expressions or dictations regarding instructions or other oral communication for steps or actions of the procedure or for the procedure as a whole. In an additional example, the sensors 112 may include eye trackers configured to determine a location on which the expert's eyes are focusing. For example, the eye trackers may determine durations of focus of the expert's eyes while performing a particular action.

In yet another example, the sensors 112 may include any other type of sensor configured to generate information that may be used individually or in combination with the data generated by the above described sensors 112. For procedures that involve the use of only the hands, the above noted types of the sensors 112 may be sufficient to capture all necessary information to convey the performance of the procedure from the expert to the user. However, other procedures may require further information that may or may not involve motion capture data. For such procedures, the sensors 112 may include further types that generate the appropriate data that may be involved in performing that type of procedure (e.g., biometric sensors).

In the exemplary embodiments, the demonstration client 114 may act as a client in a client-server relationship and may be a software, hardware, and/or firmware based application capable of generating rendering data to be provided via the network 108. In embodiments, the demonstration client 114 may provide a user interface in which the expert may initiate a session in which the rendering data is to be gathered where the rendering data is associated with performing a procedure as well as interact with one or more components of the knowledge transfer system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

The demonstration client 114 may receive the data from the sensors 112 and generate the rendering data that is subsequently used in generating a three-dimensional model of the expert that is seen by the user as displayed in a mixed reality environment. The demonstration client 114 may generate the rendering data utilizing a variety of processing operations on the motion capture data and the other data from the sensors 112. For illustrative purposes, the exemplary embodiments are described with regard to the sensors 112 including at least one imager and image data being processed, although, as noted above, other types of sensory information may be gathered. The exemplary embodiments are also described with regard to the procedure primarily involving the expert's hands in performing the actions and steps of the procedure (e.g., other body parts of the expert are irrelevant to the procedure or are merely to properly position the hands), although, as noted above, other body parts may be involved in other types of procedures.

According to the exemplary embodiments, based on the procedure being performed (e.g., as selected by the expert prior to capturing the data from the sensors), the demonstration client 114 may utilize one or more pre-made three-dimensional models of objects that are involved in the procedure (e.g., an object and its constituent parts for which the procedure is being performed, tissue for a surgical procedure, etc.). Based on the selection of the procedure, the demonstration client 114 may identify the pre-made three-dimensional models of the objects that are associated with the procedure. Using the pre-made three-dimensional models of the objects, the demonstration client 114 may segment a background from a foreground in the data from the sensors (e.g., from the images captured by the imagers). The demonstration client 114 may also detect positions of the expert's hands, skeleton, or keypoints of the hands within the images that are captured. For example, the demonstration client 114 may utilize the foreground that was determined in detecting the hand positions. Through detection of the expert (e.g., the expert's hands) and the portions of the foreground that are occupied by the expert, the demonstration client 114 may generate a three-dimensional model of the expert within the field of view of the sensors 112 in each frame that is captured. For example, the demonstration client 114 may utilize an iterative adjustment in generating the three-dimensional model of the expert. The segmentation between the object, the background, and the foreground enables the demonstration client 114 to remove the background or remove other portions in images that are not relevant to performing the procedure.

In addition, the procedure may involve one or more tools that are used by the expert in at least one action or at least one step of the procedure. The demonstration client 114 may be configured to segment handheld tools as used by the expert in the procedure by removing the background as well as the portions of the foreground that are occupied by the expert, thereby leaving only the handheld tools. According to an exemplary embodiment, the demonstration client 114 may segment the tools and assume a flat model for the tools (e.g., represent the tool as a planar object at a depth of the expert's hand). The demonstration client 114 may also utilize a mesh model of the background scene and object to render the flat model of the tool at a depth of where the tool is being used (e.g., at a depth of the palms of the hands of the expert).

In performing the above processing operations, the demonstration client 114 may generate the rendering data corresponding to the expert performing the procedure. The demonstration client 114 may select the types of data to include in the rendering data. For example, depending on the procedure, the demonstration client 114 may omit any portion of the images that are identified as background. Accordingly, the rendering data may include the three-dimensional model of the expert and the flat model of any tool that is used.

The demonstration client 114 may perform its operations utilizing an offline preparation. That is, while generating the rendering data and the other data upon which the rendering data relies, the expert device 110 may not be required to have a connection to the network 108. The expert may utilize the expert device 110, initiate the sensors 112 and/or the demonstration client 114, and perform the procedure, all while offline. The demonstration client 114 may subsequently generate the rendering data. At a later time when the expert device 110 has established a connection to the network 108, the rendering data from the expert device 110 may be transmitted to another component of the knowledge transfer system 100. It is noted that the offline preparation is only described as an illustrative manner of the exemplary embodiments. The expert device 110 may be connected to the network 108 and online while the expert is performing the procedure. While online, the expert device 110 may have access to further features that may be used by the sensors 112 in generating the corresponding sensory data and/or by the demonstration client 114 in generating the rendering data (e.g., beyond the capabilities of the demonstration client 114 alone).

In the exemplary embodiments, the data repository 120 may include one or more object data 122 and one or more rendering data 124 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the knowledge transfer system 100. For example, the data repository 120 may be incorporated in the knowledge transfer server 130. Thus, access to the data repository 120 by the knowledge transfer server 130 may be performed locally. The data repository 120 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the object data 122 may include pre-made three-dimensional models of objects that are involved in performing various procedures. As noted above, the demonstration client 114 may utilize the pre-made three-dimensional models of objects to segment an image and identify portions that are background from portions that are foreground. Thus, in one manner, the identification of an object in an image and positioning a corresponding pre-made three-dimensional model of that object into the image may enable the demonstration client 114 to determine the background and foreground. Each pre-made three-dimensional model of the object data 122 may be respectively associated with one or more procedures in which it is involved. For example, the data block for the pre-made three-dimensional model may include a header that includes the one or more procedures that the corresponding object is involved. The object data 122 may be generated and stored in the data repository 120 by any entity or individual who may associated with management of the exemplary embodiments.

In the exemplary embodiments, the rendering data 124 may include the individual rendering data generated and provided by the expert device 110. The rendering data 124 may include the various types of data as described above such as the three-dimensional model data of the expert performing the procedure as captured in the images and/or the flat model data of the tools that are used by the expert.

The knowledge transfer system 100 as illustrated in FIG. 1 shows an exemplary embodiment involving a particular expert (e.g., utilizing the expert device 110) providing the rendering data and a particular user (e.g., utilizing the user device 140) utilizing the rendering data from the expert. However, the knowledge transfer system 100 may include one or more expert devices 110 and/or one or more user devices 140 where each expert device 110 is used by a respective expert and each user device is used by a respective user. Accordingly, the rendering data 124 may include rendering data 124 from different experts where each rendering data 124 is associated with a respective expert and a respective procedure. The rendering data 124 may include an indication of the expert and the procedure (e.g., in a header of the data block). As a result of the knowledge transfer system 100 including a plurality of experts, there may be a plurality of rendering data 124 where an individual expert may provide one or more rendering data 124 and each of the rendering data 124 may be associated with a respective procedure. If the expert is so versed, the expert may provide a plurality of rendering data 124 for a single procedure (e.g., a different set of actions/steps to perform the same procedure). Multiple experts may also provide rendering data 124 for a single procedure. Thus, the rendering data 124 may include a plurality of rendering data 124 for a plurality of different procedures by a plurality of different experts.

The rendering data 124 described above relates to data that is generated by the demonstration client 114 and is associated with models of the expert performing a procedure. As will be described below, the rendering data 124 may also represent the data that is used in creating a mixed reality environment. Thus, the rendering data 124 may be modified to transport a virtual rendering as generated via the expert and provided to the user.

In the exemplary embodiments, the user device 140 may include one or more sensors 142, a display device 144, and an instruction client 146, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the user device 140 is shown as a single device, in other embodiments, the user device 140 may be comprised of a cluster or plurality of computing devices, in a modular manner, etc., working together or working independently. The user device 140 is described in greater detail as a hardware implementation with reference to FIG. 4 (e.g., data processing according to the exemplary embodiments being performed by processor 02), as part of a cloud implementation with reference to FIG. 5 (e.g., the device 140 according to the exemplary embodiments being represented by the laptop computer 54C), and/or as utilizing functional abstraction layers for processing with reference to FIG. 6 (e.g., workload layer 90 including knowledge transfer processing 96 according to the exemplary embodiments). The user device 140 may be utilized by a user who wishes to learn or reinforce a learning in performing a procedure as performed by a particular expert.

In the exemplary embodiments, the one or more sensors 142 may generate various types of information associated with sensory reception of the user. For example, the sensors 112 may include an imager such as a camera. In a particular exemplary embodiment, the camera may be a head mounted camera to provide an egocentric view from the perspective of the user. The camera may provide a scene that the user is viewing. As will be described in detail below, the perspective of the user may be modified to correspond (e.g., coincide) with a perspective of the expert such that the user has a substantially similar angle of approach to perform the procedure that the expert used in performing the procedure. The sensors 142 may also include other devices such as those described above with regard to the sensors 112 to aid in the features of the exemplary embodiments.

In the exemplary embodiments, the display device 144 may be any device configured to show a mixed reality environment to the user. For example, the display device 144 may be augmented reality glasses worn over the user's eyes. As one skilled in the art will understand, the augmented reality glasses may allow for a real world scene to be viewed (e.g., as if the augmented reality glasses were not worn) but still allow for a virtual rendering to be shown as an overlay to the real world scene. As the view of the real world scene corresponds to how the virtual rendering is positioned, the camera (e.g., of the sensors 142) may be in a fixed positioned relative to the augmented reality glasses (e.g., attached to the glasses). In another example, the display device 144 may be a camera based display in which a camera having a field of view captures and shows a real world scene in a display area of the user device 110. A virtual rendering may then be superimposed over the real world scene in the display area. Those skilled in the art will appreciate that the display device 144 of the exemplary embodiments may utilize a variety of manners to provide a mixed reality environment for the user.

In the exemplary embodiments, the instruction client 146 may act as a client in a client-server relationship and may be a software, hardware, and/or firmware based application capable of creating a mixed reality environment shown to a user using rendering data provided via the network 108. In embodiments, the instruction client 146 may provide a user interface in which the user may initiate a session in which the rendering data is received and the mixed reality environment is created for the user to perform a procedure with respective instructions being provided as well as interact with one or more components of the knowledge transfer system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

The instruction client 146 may receive the rendering data 124 and create the mixed reality environment on the display device 144. As noted above, the instruction client 146 may include a user interface from which the user may select a procedure. For example, the exemplary embodiments may be configured to instruct the user on a plurality of procedures and a menu (e.g., a list) may be shown including the different procedures for which rendering data 124 is available. For a procedure that has a plurality of rendering data 124 that is available (e.g., a plurality of experts provided rendering data 124 for the same procedure), the user may further select the specific rendering data 124 to be used (e.g., based on showing the expert who provided the rendering data 124, an explanation of the steps and/or actions that are used in the rendering data 124, etc.). If the user has no preference or based on the settings of the exemplary embodiments, a selection may be made on behalf of the user when a plurality of rendering data 124 is available for a selected procedure.

As will be described in detail below with regard to the knowledge transfer server 130, the instruction client 146 may exchange data with the knowledge transfer server 130 (e.g., the data generated by the sensor 142 and/or the display device 144) and receive the rendering data 124 that is used in creating the mixed reality environment on the display device 144.

In the exemplary embodiments, the knowledge transfer server 130 may include a tracking program 132, a modeling program 134, and a projecting program 136, and act as a server in a client-server relationship with the demonstration client 114 and the instruction client 146 as well as be in a communicative relationship with the data repository 120. The knowledge transfer server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the knowledge transfer server 130 is shown as a single device, in other embodiments, the knowledge transfer server 130 may be comprised of a cluster or plurality of computing devices, working together or working independently. While the knowledge transfer server 130 is also shown as a separate component, in other embodiments, the operations and features of the knowledge transfer server 130 may be incorporated with one or more of the other components of the knowledge transfer system 100. For example, the operations and features of the knowledge transfer server 130 may be incorporated in the expert device 110 or the user device 140. The knowledge transfer server 130 is described in greater detail as a hardware implementation with reference to FIG. 4 (e.g., data processing according to the exemplary embodiments being performed by processor 02), as part of a cloud implementation with reference to FIG. 5 (e.g., the device 110 according to the exemplary embodiments being represented by the desktop computer 54B), and/or as utilizing functional abstraction layers for processing with reference to FIG. 6 (e.g., workload layer 90 including knowledge transfer processing 96 according to the exemplary embodiments).

In the exemplary embodiments, the tracking program 132 may be a software, hardware, and/or firmware application configured to determine a perspective of a scene being viewed by the user utilizing the user device 140. The tracking program 132 may receive data from the sensor 142 of the user device 140 to determine the perspective of the scene as viewed by the user. For example, the images captured by the imager may show a particular angle at which the user is viewing the scene. The perspective of the scene may relate to a manner in which the user is looking at an area in which procedure is to be performed on one or more objects. Based on the selected procedure, the tracking program 132 may utilize the object data 122 involved in performing the procedure (e.g., the same object data 122 used by the demonstration client 114 when generating the rendering data 124). The three-dimensional model of the object data 122 may be used to also aid in determining the perspective that the user is viewing the scene.

The tracking program 132 may also be configured to instruct the user in assuming a pose or positioning that coincides with or is substantially similar to the pose or positioning that the expert used in performing the procedure for which the rendering data 124 was generated. At the start of a procedure, the user may be instructed to assume a particular pose and/or position based on the pose/position the expert used in generating the rendering data 124 and based on a current pose/position that the user is presently exhibiting. Through an initial correspondence in pose/position between the expert and the user, subsequent actions and/or steps of the expert may be emulated by the user also in similar pose/position.

The tracking program 132 may further be configured to continuously track the user while the user is performing the procedure. That is, the tracking program 132 may continue to receive images from the sensor 142 during a time that the user is performing the procedure. In this manner, the tracking program 132 may instruct the user in changing a pose and/or position so that the virtual rendering provided in the mixed reality environment is properly provided to the user. For example, the tracking program 132 may anchor the virtual rendering to the user's scene based on the initial pose/position that the user assumed corresponding to the expert's pose/position. In this manner, the tracking program 132 may continuously monitor the user and the perspective that the user is exhibiting while performing the procedure. The tracking program 132 may generate perspective data that may be used to modify how a virtual rendering is to be displayed in the mixed reality environment. For example, the user's scene may be defined with scene coordinates such that the anchoring the virtual rendering to the user's scene may result in modifying the virtual rendering using the perspective of the expert's imager with respect to the scene coordinates.

The tracking program 132 may additionally determine when the user may be required to return to a proper pose or position to continue the mixed reality environment. For example, despite the anchoring to the user's scene for any virtual rendering, the user may step away from the scene. The tracking program 132 may determine a measure of a discrepancy between a background and/or hand projection and actual image as an indicator of a quality assurance. The tracking program 132 may generate an alert or signal to warn and/or stop the virtual rendering and direct the user back to a pose and/or position for a proper virtual rendering to be created for the mixed reality environment.

In the exemplary embodiments, the modeling program 134 may be a software, hardware, and/or firmware application configured to generate the virtual rendering for the mixed reality environment that is viewed by the user. The modeling program 134 may utilize the rendering data 124 to generate the virtual rendering. For example, as described above, the rendering data 124 may include a three-dimensional model of the expert and a flat model for any tools used by the expert. In the exemplary embodiment where the user is instructed to emulate the pose and/or positioning of the expert, the modeling program 134 may generate the virtual rendering of the expert and tools to reflect the expert and tools at the time the rendering data 124 was generated. The virtual rendering of the expert may be generated using a generic three-dimensional model of a person and modifying the generic model to conform to the expert via the skeleton, keypoints, etc. In the exemplary embodiment where the user may move and the perspective of the user is monitored, the modeling program 134 may generate the virtual rendering of the expert and tools and perform appropriate modifications (e.g., translation, rotation, etc.) based on the current perspective of the user. It is noted that the virtual rendering of the expert is described as a three-dimensional rendering while the virtual rendering of the tool is described as a flat model. However, such virtual renderings are only for illustrative purposes and the virtual rendering of the expert may be a flat model or the virtual rendering of the tool may be three-dimensional.

In the exemplary embodiments, the projecting program 136 may be a software, hardware, and/or firmware application configured to receive the virtual rendering and transmit the appropriate information such that the display device 144 may project the virtual rendering in the mixed reality environment of the user. The projecting program 136 may utilize the three-dimensional model of the expert (e.g., model of the hands and arms of the expert) to transport a foreground image from the images captured by the sensors 112 and processed by the demonstration client 114 of the expert device 110. In a particular moment, the projecting program 136 may transport the foreground image at the start of the procedure (e.g., when the user is prepared to perform the procedure). The projecting program 136 may transport the foreground image including the three-dimensional model of the expert by registering a texture from the images from the expert to a three-dimensional model as well as include any flat extension for flat models of tools that were used by the expert during the procedure. In this manner, the projecting program 136 may instruct the display device 144 to project the model onto the user's view in the mixed reality environment along with the texture. In a particular exemplary embodiment, the three-dimensional model of the expert may be observed over the user's own corresponding body part so that the user may mimic the actions of the expert. The projecting program 136 may further play back any audio that may have been recorded at the corresponding times. The audio playback may be associated with the rendering data 124 (e.g., included with the rendering data 124, stored separately from but associated with the rendering data 124, etc.).

As the above process of creating the mixed reality environment relies on a connection between the user device 140, the knowledge transfer server 130, and the data repository 120 via the network 108, the exemplary embodiments may utilize an online process. Thus, in an exemplary embodiment, the offline preparation may entail generating the rendering data 124 by the expert where the rendering data 124 is subsequently stored in the data repository 120. Then, the online process may entail creating the mixed reality environment using the rendering data 124 from the expert at a time the user is performing the procedure based on instructions provided by the expert via the virtual rendering in the mixed reality environment.

According to a particular exemplary embodiment, the expert may record an egocentric video during a demonstration of the procedure. The expert device 110 (e.g., via the demonstration client 114) may record the video using a particular type of the sensor 112. For example, the sensor 112 may be a red-blue-green depth (RBGD) camera that is mounted on a wearable augmented reality device (e.g., glasses or helmet) worn by the expert where the wearable augmented reality device is configured to track the scene of the expert. In the offline preparation to generate the rendering data 124, for each image from the video, the demonstration client 114 may remove unoccluded regions of the tracked scene. In the online process of utilizing the rendering data 124, a registered three-dimensional image of the expert's hands and a flat image of any tool may be produced from the RGBD image. When a user arrives at a new instance of the scene using a wearable augmented reality device (e.g., glasses), the user may observe the expert's hands and use of any tool in performing the procedure, accompanied by the expert's voice, from any point of view.

Figure 2:
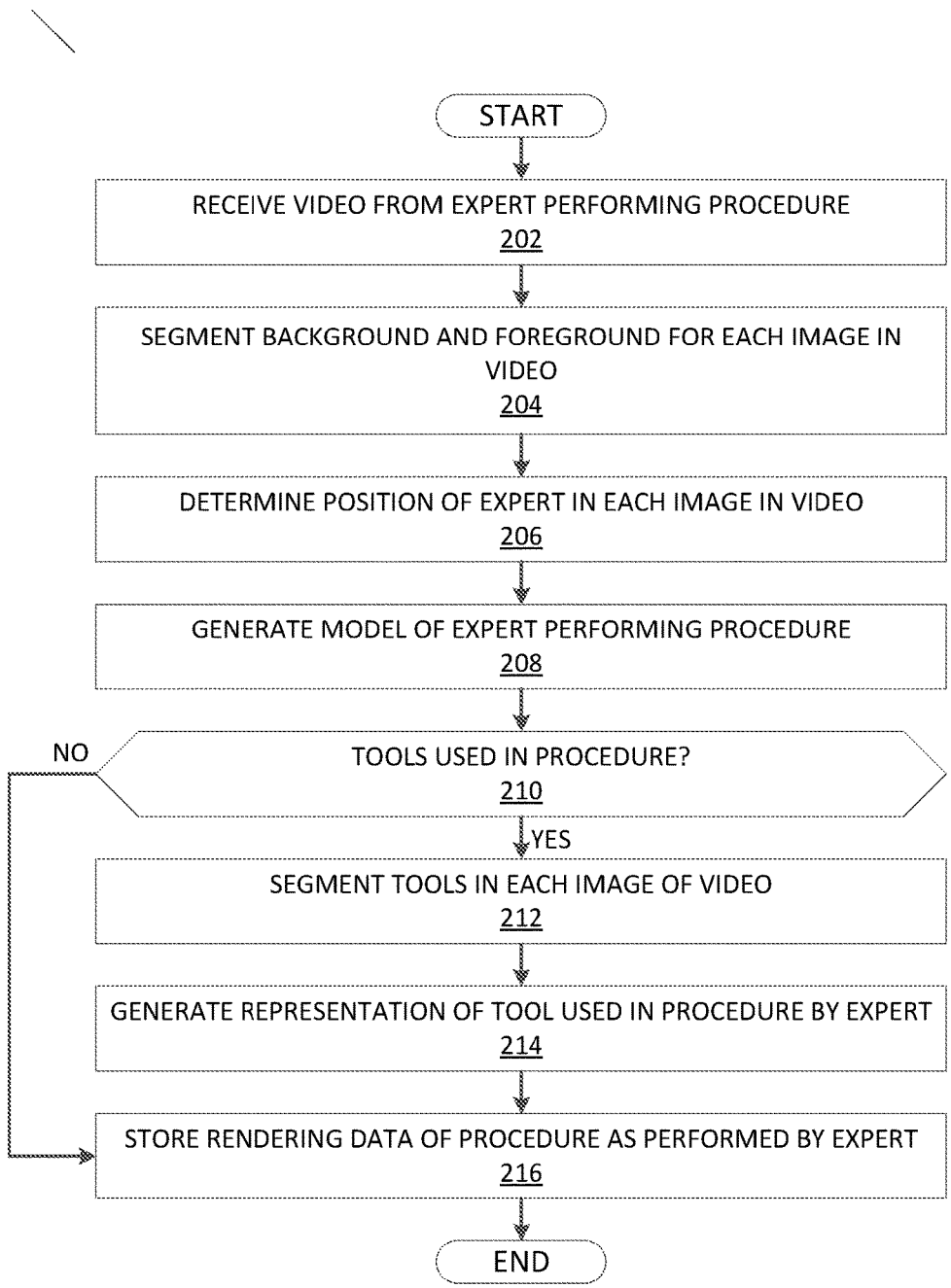
FIG. 2 depicts an exemplary flowchart of a method illustrating the operations of an expert device 110 of the knowledge transfer system 100 in generating rendering data of a procedure as performed by an expert, in accordance with the exemplary embodiments.

FIG. 2 depicts an exemplary flowchart of a method 200 illustrating the operations of the expert device 110 of the knowledge transfer system 100 in generating rendering data of a procedure as performed by the expert, in accordance with the exemplary embodiments. The method 200 may relate to operations that are performed by the demonstration client 114 based on data gathered by the sensors 112. The method 200 will be described from the perspective of the expert device 110. Specifically, the method 200 will be described as the offline preparation portion of the exemplary embodiments.

In an exemplary embodiment, in a preliminary manner, the expert utilizing the expert device 110 may identify the procedure that is to be performed and recorded. The expert may also indicate the expert's identity as well as any other relevant information (e.g., education, experience, etc., particularly with regard to the procedure). The expert may utilize a user interface of the demonstration client 114 to provide any information that may be useful for a user to know prior to selecting the rendering data 124 associated therewith.

The expert device 110 may receive video from an expert performing a procedure (step 202). The expert device 110 may include the sensor 112 that may be an imager configured to capture a series of images such as in a video within a field of view. The imager may be positioned to capture body parts of the expert while performing the procedure. For example, the imager may capture the expert's hands, arms, etc. The imager may also capture an object that may be involved in the procedure. For example, the object may be a device, patient, etc. on which the expert is performing the procedure. The imager may additionally capture any tool that may be used where the tool may be hand-held, fixedly placed near the object, movably placed near the object, etc.

The expert device 110 may segment a background from a foreground for each image in the video (step 204). In segmenting the background and the foreground, the expert device 110 may utilize the object involved in the procedure as the basis in identifying between the foreground and background. In the segmentation process, the expert device 110 may use a pre-made three-dimensional model of the object that is stored as object data 122. The expert device 110 may have access to object data 122 that is stored in the data repository 120. For example, through a connection via the network 108, the expert device 110 may retrieve the object data 122. In another example, the expert device 110 may have locally stored the object data 122 in preparation for the offline preparation. Using the object data 122 for the object in the image of the video, the expert device 110 may utilize the object as a reference point as to portions that are background and portions that are foreground. For example, the expert device 110 may perform a depth analysis in the image such that portions that are behind the object may be considered background while portions that are in front of or at least level with the object may be considered foreground. The expert device 110 may determine a position of the expert in each image of the video (step 206). Within the foreground, the expert device 110 may detect two-dimensional positions of the body parts of the expert such as hand keypoints within the images of the video.

The expert device 110 may generate a model of the expert performing the procedure (step 208). Based on the body parts of the expert (e.g., hands, arms, etc.) that are identified in the foreground, the expert device 110 may generate a three-dimensional model of the expert in each image or frame of the video. The expert device 110 may utilize various modeling techniques to generate the model. For example, the expert device 110 may use an iterative adjustment.

The expert device 110 may determine whether any tools are being used in the procedure by the expert (decision 210). In segmenting the background from the foreground using the object as the reference point, the foreground will include the expert and any tool that may be used by the expert. As a result of a tool being used, the expert device 110 may identify the tool by removing from consideration portions in the foreground that are identified as the expert. However, there are procedures where the expert may not require any tools during the entire procedure or at least for certain actions/steps of the procedure. As a result of the expert not using any tools for at least one step or action in the procedure as captured in the images or frames of the video (decision 210, "NO" branch), the expert device may store rendering data 124 of the procedure as performed by the expert (step 216). In this instance, the rendering data 124 may include the three-dimensional model data of the expert performing the procedure. The rendering data 124 may include further information such as the identity of the expert.

As a result of the expert using at least one tool (decision 210, "YES" branch), the expert device 110 may segment the tool in each image of the video (step 212). In an exemplary embodiment, the expert device 110 may be configured to determine a size and shape of the tool that is being used within each image of the video. In another exemplary embodiment, the object data 122 may include information regarding the various tools that may be used in procedures. Thus, the expert device 110 may identify the tool by segmenting the tool from removing the background and the expert in the foreground. The expert device 110 may generate a representation of the tool used in the procedure by the expert (step 214). In an exemplary embodiment, the expert device 110 may assume a flat model for the tool. For example, the flat model may be a planar object at a depth of the user's hand for hand-held tools. In another example, the flat model may be a planar object at an identified depth, particularly for tools that are not hand-held at a depth that differs from the expert's hands.

The expert device 110 may store rendering data 124 of the procedure as performed by the expert (step 216). In this instance, the rendering data 124 may include the three-dimensional model data of the expert performing the procedure as well as the flat model of the tool that is used by the expert in performing the procedure. Again, the rendering data 124 may include further information such as the identity of the expert.

As noted above, the sensors 112 may include a microphone. While performing the procedure, the expert may also provide oral instructions that are captured as audio data with corresponding time stamps that are associated with images or frames of the video. The audio data may also be stored in the rendering data 124.

To further illustrate the operations of the expert device 110 in generating the rendering data 124, reference is now made to an illustrative exemplary process that includes additional operations that may be incorporated. According to the illustrative exemplary process, an expert may show a demonstration of performing a procedure on an electronic device to fix or replace a broken component. There may be a plurality of steps and/or actions that the expert may perform in this procedure. For example, the expert may perform a diagnostic to identify the broken component, open the device, access an area that includes the broken component, remove and replace the broken component with a functioning component, close the device, and perform another diagnostic to ensure the device is operating properly. In performing the offline preparation, the expert may have accessed the data repository 120 at a prior time while establishing a connection via the network 108. While connected, the expert may have provided an input for the procedure such that the appropriate object data 122 is retrieved (e.g., for the device and all components, any tools that are used, etc.).

To initiate the offline preparation, the expert may utilize the demonstration client 114. In activating the demonstration client 114, the expert may utilize the user interface and enter an input indicative of the procedure that is about to be performed and to be recorded. The demonstration client 114 may activate all necessary ones of the sensors 112 to gather sensory information that is used to generate the rendering data 124 such as an imager to capture images or frames of a video, a microphone to capture audio inputs from the expert, etc. Accordingly, while the expert is performing the procedure, the sensors 112 may gather corresponding sensory information.

In generating the rendering data 124, the demonstration client 114 may process the sensory information from the sensors 112. For example, the demonstration client 114 may determine that the electronic device is the object on which the procedure is being performed. The object data 122 corresponding to the electronic device may be utilized where the object data 122 includes a pre-made three-dimensional model of the electronic device. By adjusting a size and orientation of the pre-made three-dimensional model of the electronic device to coincide with the electronic device captured in the images of the video, the demonstration client 114 may determine portions of the images that constitute foreground and portions of the images that constitute background. Within the foreground, the demonstration client 114 may detect positions in the images of the video that correspond to areas occupied by the expert. The demonstration client 114 may use a modeling technique to generate and three-dimensional model of the expert as visible in the images of the video. The demonstration client 114 may also identify that the expert utilizes various tools in the procedure such as a screwdriver, a soldering iron, solder, tweezers, etc. The demonstration client 114 may determine positions of these tools when used by the expert during the procedure (e.g., the screwdriver may be used when opening and closing a casing of the electronic device, the soldering iron may be used to remove solder that is holding the broken component such as a circuit on a circuit board, the soldering iron and solder may be used to insert the functioning component, the tweezers may be used to handle small components, etc.). Once identified, the demonstration client 114 may generate flat models representing the tools at the appropriate depth. The demonstration client 114 may further process the audio inputs from the expert such as oral instructions that are spoken while performing each step or action of the procedure. The demonstration client 114 may thereby generate the rendering data 124 that includes the three-dimensional model of the expert, the flat model(s) of the tool(s), the audio commentary, etc. The demonstration client 114 may transmit the rendering data 124 to the data repository 120 at a subsequent time when the expert device 110 has established a connection to the data repository 120 via the network 108.

Figure 3:
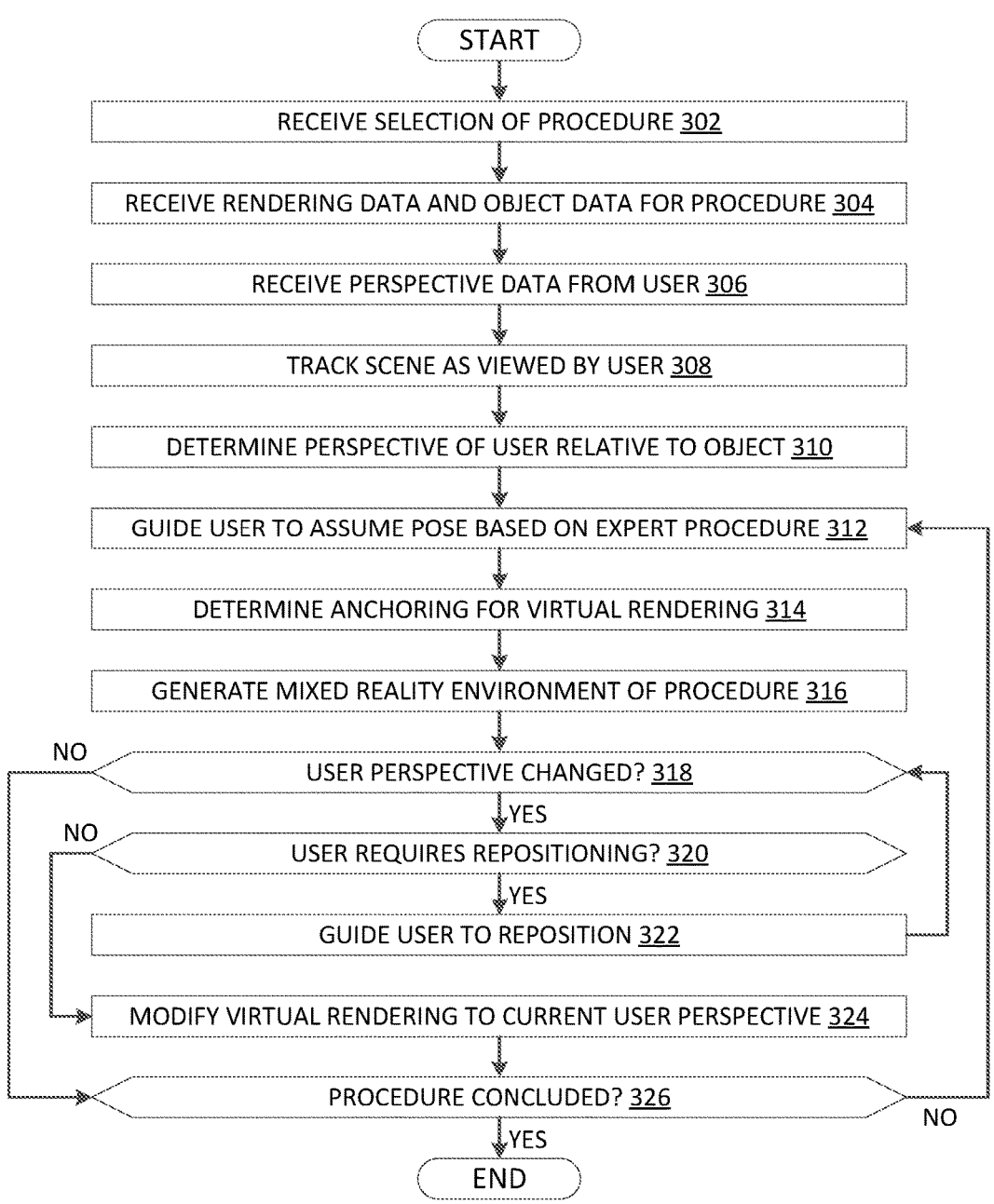
FIG. 3 depicts an exemplary flowchart of a method illustrating the operations of a knowledge transfer server 130 of the knowledge transfer system 100 in generating a mixed reality rendering of a procedure as performed by an expert, in accordance with the exemplary embodiments.

FIG. 3 depicts an exemplary flowchart of a method 300 illustrating the operations of a knowledge transfer server 130 of the knowledge transfer system 100 in generating a mixed reality rendering of a procedure as performed by an expert, in accordance with the exemplary embodiments. The method 300 may relate to operations that are performed by the tracking program 132, the modeling program 134, and the projecting program 136 of the knowledge transfer server 130 while cooperating with the sensor 142, the display device 144, and the instruction client 146 of the user device 140. The method 300 will be described from the perspective of the knowledge transfer server 130 with reference to the user device 140. Specifically, the method 300 will be described as the online process portion of the exemplary embodiments.

The knowledge transfer server 130 may receive selection of a procedure for which a user utilizing the user device 140 requests instructions through a mixed reality environment (step 302). The user may utilize the user device 140 and access a service offered by the knowledge transfer server 130. For example, the user may use the instruction client 146 to enter the inputs in selecting the procedure. Based on the selected procedure, the knowledge transfer server 130 may receive rendering data 124 and object data 122 for the selected procedure (step 304). As noted above, the rendering data 124 may include the three-dimensional model of the expert performing the procedure, the flat model of any tool used by the expert in performing the procedure, audio commentary that may be included, etc. The object data 122 may include a pre-made three-dimensional model of the object on which the procedure may be performed.

The knowledge transfer server 130 may receive perspective data of the user from the user device 140 (step 306). Accordingly, the knowledge transfer server 130 may track the scene as viewed by user (step 308). The user device 140 may include the sensors 142 that generate sensory information of the user, particularly a scene that is being viewed by the user at any particular moment. The knowledge transfer server 130 may continuously receive the video from the user device 140 indicating a field of view being seen by the user. The knowledge transfer server 130 may then determine a perspective of the user relative to the object of the procedure. In this manner, the object of the procedure may again be used as a reference to determine the perspective by resizing and orienting the pre-made three-dimensional model of the object as indicated in the object data 122 to the object as seen in the images of the video. Thus, the knowledge transfer server 130 may determine a perspective of user relative to the object (step 310).

The knowledge transfer server 130 may guide user to assume a pose or position based on how the expert performed the procedure (step 312). Based on the perspective of the user, the knowledge transfer server 130 may initially request that the user assume the same pose/position as the expert at the start of the expert's performance of the procedure. For example, the knowledge transfer server 130 may instruct the user to an angle at which the user is to view the object. In another example, the knowledge transfer server 130 may instruct the user to change the angle or position of the object. In a further example, the knowledge transfer server 130 may instruct a placement of body parts of the user. In this manner, the initial setup of the user and object may coincide with the initial setup that the expert exhibited as the procedure was about to begin.

The knowledge transfer server 130 may determine an anchoring for any virtual rendering to the user's scene (step 314). Once the initial pose and positioning of the user and object coincide with the initial pose and positioning of the expert and object, the knowledge transfer server 130 may anchor any virtual rendering to the user's scene for changes in perspective made by the user based on the initial assumption of the pose or position by the user relative to the start of the demonstration performed by the expert. The assumption of the pose or position of the user to coincide with the pose or position of the expert may enable the knowledge transfer server 130 to anchor any virtual rendering for dynamic and automatic modification to the virtual rendering based on the user perspective. In this manner, the user may be presented with the virtual rendering from any point of view through modifications of the virtual rendering.

The knowledge transfer server 130 may generate a mixed reality environment of the procedure (step 316). Through the display device 144 that is configured to present a mixed reality environment, the knowledge transfer server 130 may generate the virtual rendering of the expert and any tool that was used by the expert. For example, the knowledge transfer server 130 may utilize the three-dimensional model of the expert and the flat model of the tool as a basis of generating the virtual rendering to be used in the mixed reality environment.

The knowledge transfer server 130 may determine whether a user perspective has changed (decision 318). At any time after the procedure has started, the user may choose to change a perspective at which the object is viewed. For example, there may be an area not currently visible that the user may be curious to see. In another example, the expert may have included an audio commentary about an area that is not currently visible but is worth viewing by the user. In such a scenario, the user may change the perspective during the procedure. As a result of the user perspective changing (decision 318, "YES" branch), the knowledge transfer server 130 may determine whether the user requires repositioning (decision 320). For example, the user may step out of an area in which the mixed reality environment is being created. In another example, the user may take a pose where the mixed reality environment may not be sufficiently created (e.g., a discrepancy may be determined using a flat background determined via segmentation, hand projection, and an actual image as an indicator of view quality of the mixed reality environment, where the discrepancy may have a value that is outside or greater than an acceptable quality threshold). As a result of the user requiring repositioning (decision 320, "YES" branch), the knowledge transfer server 130 may guide the user to reposition so that an acceptable mixed reality environment may be created (step 322). Subsequently, the knowledge transfer server 130 may determine the current user perspective and proceed accordingly.

As a result of the user perspective changing (decision 318, "YES" branch) and the user being properly positioned for a sufficient mixed reality environment to be created (decision 320, "NO" branch), the knowledge transfer server 130 may modify the virtual rendering to a current user perspective based on the anchoring performed via the initial assumption of the pose or position by the user coinciding with the pose or position of the expert (step 324). Using the anchoring, the knowledge transfer server 130 may determine the manner in which the user perspective has changed to provide a corresponding change to the virtual rendering that is being presented in the mixed reality environment.

In continuing the operations of the knowledge transfer server 130 such as when the user perspective has not changed (decision 318, "NO" branch) or after the virtual rendering has been modified, the knowledge transfer server 130 may determine whether the procedure has concluded (decision 326). As a result of the procedure still ongoing (decision 326, "NO" branch), the knowledge transfer server 130 may continue to generate the mixed reality environment to be presented to the user via the display device 144. As a result of the procedure concluding (decision 326, "YES" branch), the knowledge transfer server 130 may terminate the virtual rendering for the mixed reality environment.

To further illustrate the operations of the knowledge transfer server 130 and the user device 140 in creating the mixed reality environment, reference is now made to an illustrative exemplary process that includes additional operations that may be incorporated. According to the illustrative exemplary process, in continuing the example described above with regard to the method 200, the procedure may be to replace a broken component in an electronic device. The rendering data 124 may include the three-dimensional model of the expert's hands while utilizing any tool and performing the procedure. The user may have selected the procedure via the user interface of the instruction client 146. For example, the user interface may present a list of available technical areas in which instruction according to the features of the exemplary embodiments is available. The list may include a sub-list of available demonstrations from various experts. The user may select the procedure and/or the expert.

Based on the selection, the knowledge transfer server 130 may retrieve the rendering data 124 and the object data 122 for the selected procedure. As an initial process, the knowledge transfer server 130 may instruct the user to assume a pose and/or position that coincides with the initial pose and/or position that the expert exhibited in generating the rendering data 124. The knowledge transfer server 130 may also instruct the user to change the orientation of the electronic device. The knowledge transfer server 130 may determine the manner in which to instruct the user through the pre-made three-dimensional model of the electronic device and how the model fits with the actual electronic device in the scene of the user.

Once the user assumes a pose and/or position of the expert, the knowledge transfer server 130 may establish an anchor such that any change to the user perspective may result in a corresponding change to the virtual rendering to be used in the mixed reality environment. For example, although the procedure does not require a view of an underside of the electronic device, the user may move to view the underside. The virtual rendering may be modified to have a corresponding change to the angle of the virtual rendering. The mixed reality environment may therefore by provided to the user that allows the user to perform the procedure using any point of view or perspective while still providing the virtual rendering of the expert's actions at the appropriate perspective.

The above described features of the exemplary embodiments include a plurality of operations that are actively performed by the knowledge transfer server 130 to transfer the expert's knowledge to the user via the virtual rendering from any perspective that the user may exhibit. From the perspective of the user, the knowledge transfer server 130 may instruct the user to assume the initial pose that the expert exhibited at the start of the demonstration of the procedure. However, for subsequent steps of the procedure, the user may utilize any perspective or pose where the virtual rendering may be provided in a seamless and automatic manner from the viewpoint of the user.

The exemplary embodiments are configured to provide an autonomous transfer of an expert's knowledge from a hands-on demonstration of a procedure through a display of the expert's hands and tools, a playback of the expert's verbal explanations, and anchoring a virtual rendering for a mixed reality environment to a user's scene so that any point of view may be used. The exemplary embodiments generate rendering data based on the expert performing the procedure so that the virtual rendering may be generated and included in the mixed reality environment for the user. Accordingly, the exemplary embodiments enable an efficient transfer of knowledge where the user mimics the expert's position and movements while observing the expert's hands in place of the user's own hands.

Figure 4:
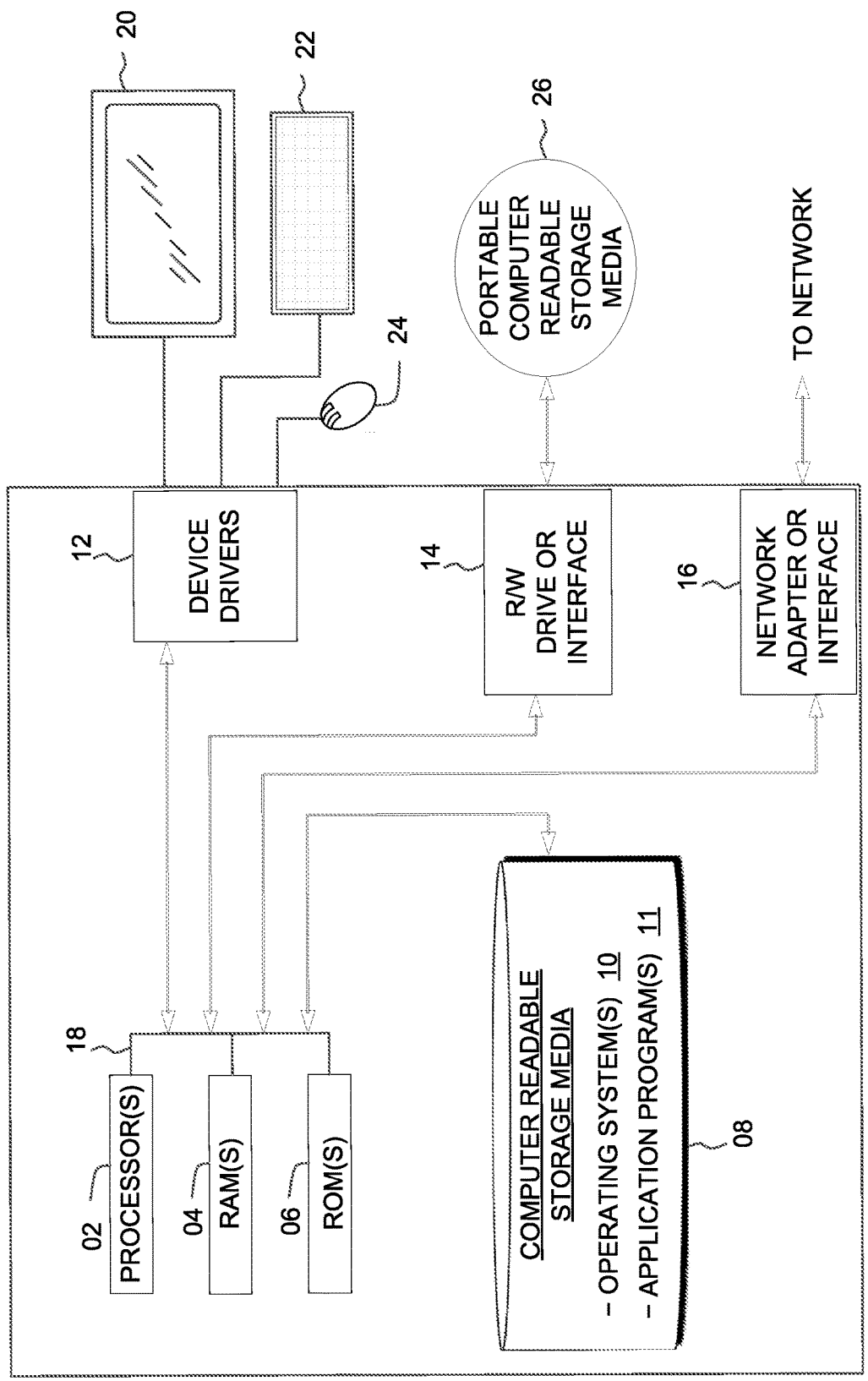
FIG. 4 depicts an exemplary block diagram depicting the hardware components of the knowledge transfer system 100 of FIG. 1, in accordance with the exemplary embodiments.

FIG. 4 depicts a block diagram of devices within the knowledge transfer system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
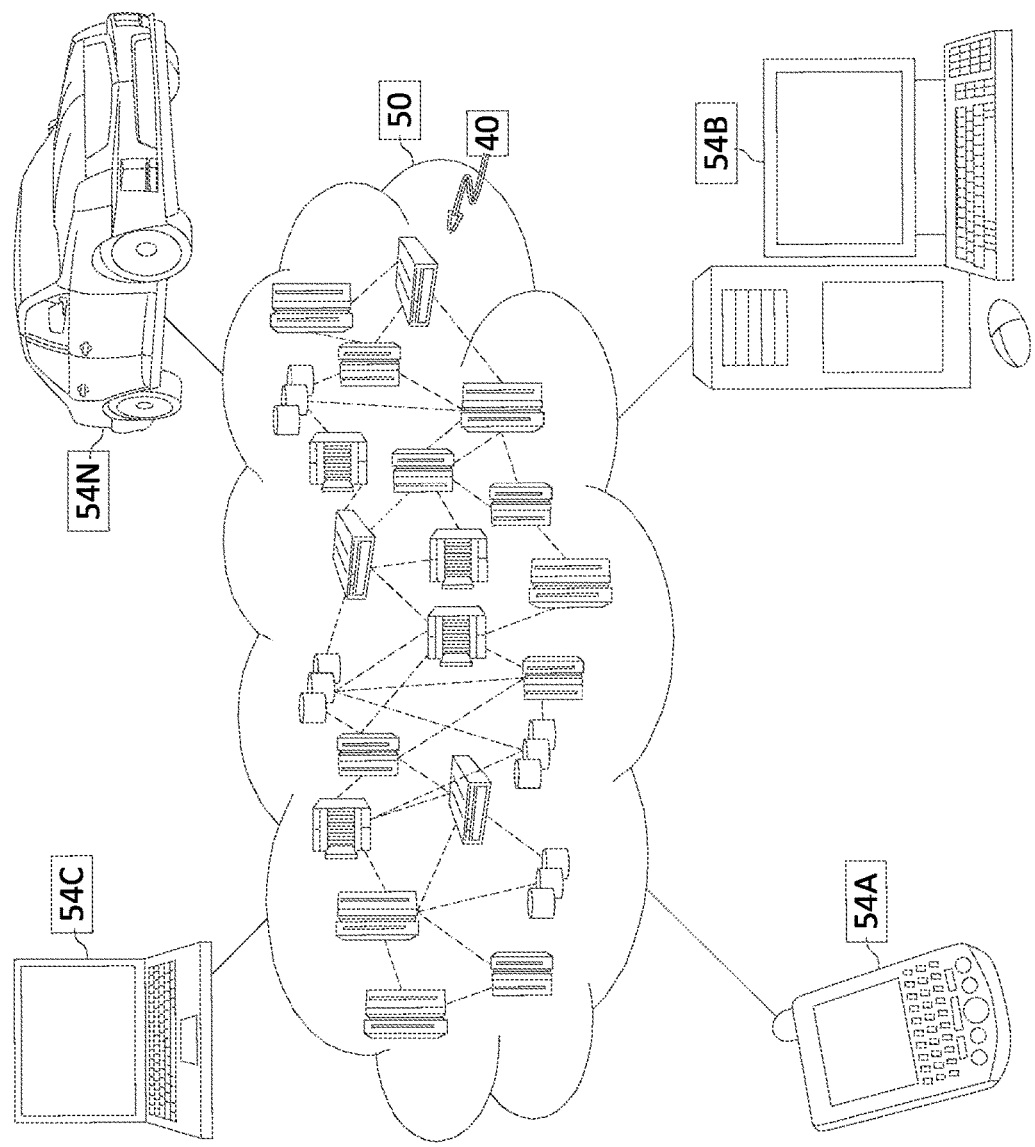
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
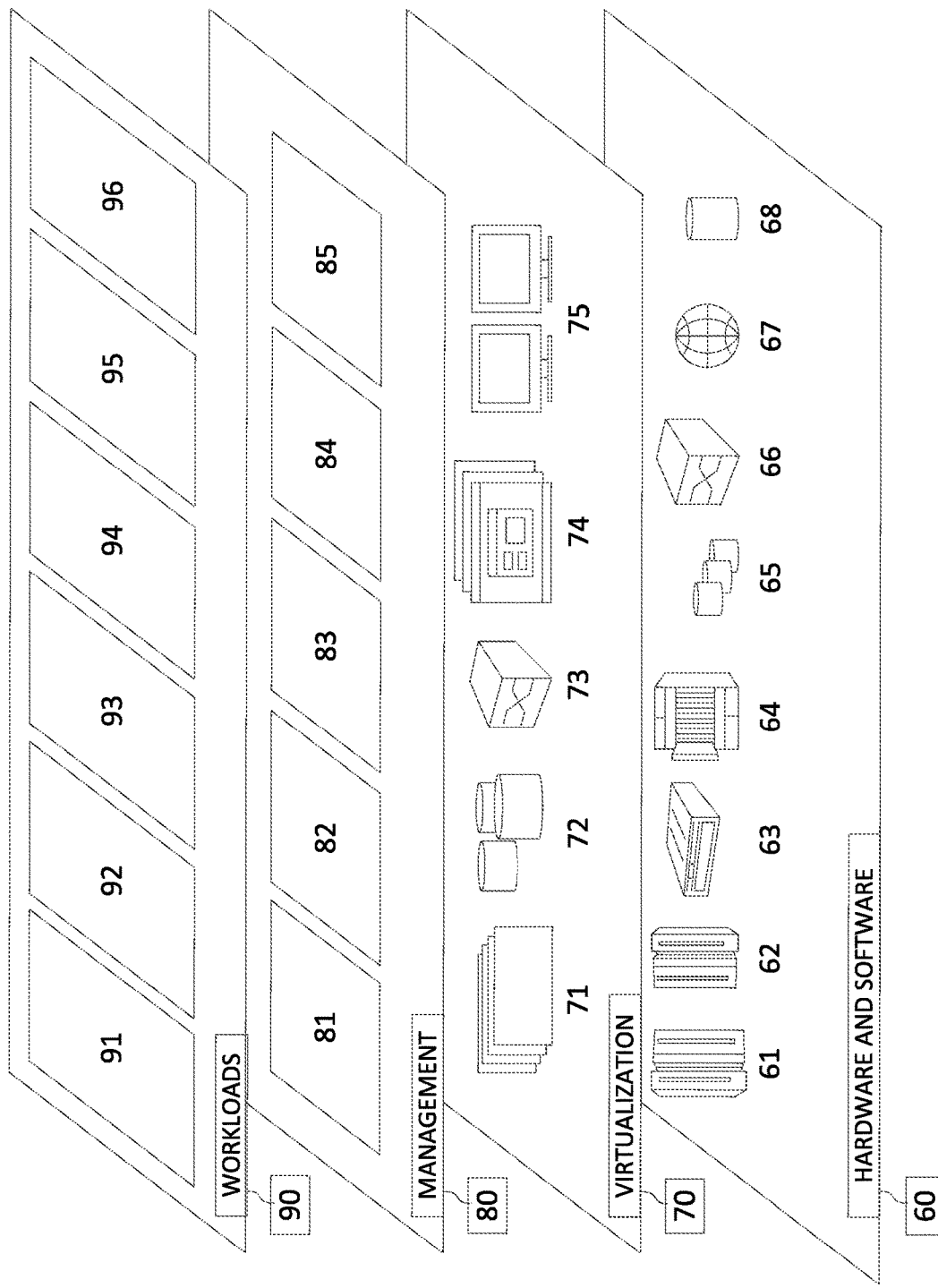
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and knowledge transfer processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for transferring knowledge from an expert to a user
   using a mixed reality rendering, the method comprising:
      determining a user perspective of a user viewing an object on which a procedure is to be performed;
      determining an anchoring of the user perspective to an expert perspective, the expert perspective associated with an expert providing a demonstration of the procedure;
      generating a virtual rendering of the expert at the user perspective based on the anchoring at a scene viewed by the user, the virtual rendering corresponding to the demonstration of the procedure as performed by the expert; and
      generating a mixed reality environment in which the virtual rendering of the expert is shown in the scene viewed by the user, wherein the virtual rendering of the expert is a three-dimensional model of the expert based on rendering data captured while the expert performed the demonstration, and wherein the rendering data is generated using images captured while the expert performed the demonstration, the images being processed to segment a background and a foreground using a demonstration object as a reference, the demonstration object corresponding to the object, the foreground including the expert, the rendering data being based on the foreground of the images.

2. The computer-implemented method of claim 1, wherein determining the user perspective comprises:
determining an object orientation of the object in a scene viewed by the user based on an object model.

3. The computer-implemented method of claim 1, further comprising:
as a result of determining the user perspective with respect to the scene, guiding the user to assume a pose substantially similar to that of the expert when the demonstration of the procedure was performed by the expert.

4. The computer-implemented method of claim 1, wherein generating the virtual rendering comprises:
using the images captured in a video while the expert performed the demonstration, determining keypoints of the expert in each image of the video; and
generating the three-dimensional model of the expert by adjusting a generic three-dimensional model of a person based on the keypoints,
wherein the three-dimensional model of the expert is anchored to scene coordinates of the scene viewed by the user based on a perspective of an imager capturing the images in the video while the expert performed the demonstration with respect to the scene coordinates.

5. The computer-implemented method of claim 4, wherein the virtual rendering of the expert includes a model of a tool used by the expert while the expert performed the demonstration.

6. The computer-implemented method of claim 5, further comprising:
identifying portions corresponding to the tool in the images captured while the expert performed the demonstration,
wherein the background is segmented for each image by removing further portions corresponding to the expert and the portions in the image corresponding to the tool.

7. The computer-implemented method of claim 5, wherein the tool is a handheld tool, and wherein the model of the tool is a flat model at a depth of the hands of the expert in the images captured while the expert performed the demonstration.

8. The computer program product of claim 6, wherein determining the user perspective comprises:
determining an object orientation of the object in a scene viewed by the user based on an object model.

9. The computer program product of claim 6, wherein the method further comprises:
as a result of determining the user perspective with respect to the scene, guiding the user to assume a pose substantially similar to that of the expert when the demonstration of the procedure was performed by the expert.

10. The computer-implemented method of claim 1, wherein the virtual rendering of the expert is a three-dimensional model of hands of the expert.

11. A computer program product for transferring knowledge from an expert to a user using a mixed reality rendering, the computer program product comprising:
one or more non-transitory computer-readable storage media and program instructions stored on the one or more non-transitory computer-readable storage media capable of performing a method, the method comprising:
determining a user perspective of a user viewing an object on which a procedure is to be performed;
determining an anchoring of the user perspective to an expert perspective, the expert perspective associated with an expert providing a demonstration of the procedure;
generating a virtual rendering of the expert at the user perspective based on the anchoring at a scene viewed by the user, the virtual rendering corresponding to the demonstration of the procedure as performed by the expert; and
generating a mixed reality environment in which the virtual rendering of the expert is shown in the scene viewed by the user,
wherein the virtual rendering of the expert is a three-dimensional model of the expert based on rendering data captured while the expert performed the demonstration, and
wherein the rendering data is generated using images captured while the expert performed the demonstration, the images being processed to segment a background and a foreground using a demonstration object as a reference, the demonstration object corresponding to the object, the foreground including the expert, the rendering data being based on the foreground of the images.

12. The computer program product of claim 11, wherein generating the virtual rendering comprises:
using the images captured in a video while the expert performed the demonstration, determining keypoints of the expert in each image of the video; and
generating the three-dimensional model of the expert by adjusting a generic three-dimensional model of a person based on the keypoints,
wherein the three-dimensional model of the expert is anchored to scene coordinates of the scene viewed by the user based on a perspective of an imager capturing the images in the video while the expert performed the demonstration with respect to the scene coordinates.

13. The computer program product of claim 12, wherein the virtual rendering of the expert includes a model of a tool used by the expert while the expert performed the demonstration.

14. The computer program product of claim 13, wherein the method further comprises:
identifying portions corresponding to the tool in the images captured while the expert performed the demonstration,
wherein the background is segmented for each image by removing further portions corresponding to the expert and the portions in the image corresponding to the tool.

15. The computer program product of claim 13, wherein the tool is a handheld tool, and wherein the model of the tool is a flat model at a depth of the hands of the expert in the images captured while the expert performed the demonstration.

16. A computer system for transferring knowledge from an expert to a user using a mixed reality rendering, the computer system comprising:

one or more computer processors, one or more computer-readable storage media, and program instructions stored on the one or more of the computer-readable storage media for execution by at least one of the one or more processors capable of performing a method, the method comprising:

determining a user perspective of a user viewing an object on which a procedure is to be performed;

determining an anchoring of the user perspective to an expert perspective, the expert perspective associated with an expert providing a demonstration of the procedure;

generating a virtual rendering of the expert at the user perspective based on the anchoring at a scene viewed by the user, the virtual rendering corresponding to the demonstration of the procedure as performed by the expert; and generating a mixed reality environment in which the virtual rendering of the expert is shown in the scene viewed by the user, wherein the virtual rendering of the expert is a three-dimensional model of the expert based on rendering data captured while the expert performed the demonstration, and wherein the rendering data is generated using images captured while the expert performed the demonstration, the images being processed to segment a background and a foreground using a demonstration object as a reference, the demonstration object corresponding to the object, the foreground including the expert, the rendering data being based on the foreground of the images.

* * * * *